United States Patent
Watari

(10) Patent No.: US 9,868,348 B2
(45) Date of Patent: Jan. 16, 2018

(54) FIXING STRUCTURE AND GRILLE SHUTTER UNIT

(71) Applicant: FALTEC Co., Ltd., Kawasaki-shi (JP)

(72) Inventor: Tomoyuki Watari, Kawaguchi (JP)

(73) Assignee: FALTEC CO., LTD., Kawasaki-Shi (JP)

(*) Notice: Subject to any disclaimer, the term of this patent is extended or adjusted under 35 U.S.C. 154(b) by 0 days.

(21) Appl. No.: 15/193,967

(22) Filed: Jun. 27, 2016

(65) Prior Publication Data

US 2017/0001514 A1 Jan. 5, 2017

(30) Foreign Application Priority Data

Jun. 30, 2015 (JP) ................................. 2015-130647

(51) Int. Cl.
*B60K 11/08* (2006.01)
*B60R 19/52* (2006.01)

(52) U.S. Cl.
CPC ............ *B60K 11/085* (2013.01); *B60R 19/52* (2013.01); *B60R 2019/525* (2013.01)

(58) Field of Classification Search
CPC .. B60K 11/085; B60R 19/52; B60R 2019/525
USPC ...................................... 296/193.1; 180/68.1
See application file for complete search history.

(56) References Cited

U.S. PATENT DOCUMENTS

| | | | | |
|---|---|---|---|---|
| 4,593,441 A * | 6/1986 | St Louis | ............... | F16B 5/0614 24/295 |
| 6,422,643 B1 * | 7/2002 | Pease | ..................... | B60R 19/52 24/297 |
| 8,646,552 B2 * | 2/2014 | Evans | .................. | B60K 11/085 180/68.1 |
| 2006/0249961 A1 * | 11/2006 | Flotzinger | ............... | B60R 19/04 293/115 |
| 2007/0222238 A1 * | 9/2007 | Kobayashi | .......... | B29C 45/0081 293/115 |
| 2008/0079271 A1 * | 4/2008 | Maruko | .................. | B60R 19/52 293/102 |
| 2008/0317549 A1 * | 12/2008 | Matthews | ............... | B60R 19/52 403/376 |
| 2010/0148525 A1 * | 6/2010 | Abdelnour | .............. | B60R 19/52 293/115 |
| 2011/0204680 A1 * | 8/2011 | Fortin | ..................... | B60R 19/18 296/193.1 |
| 2012/0019025 A1 * | 1/2012 | Evans | .................. | B60K 11/085 296/193.1 |

(Continued)

FOREIGN PATENT DOCUMENTS

JP S6353006 U 4/1988
JP 2000110808 A 4/2000

(Continued)

OTHER PUBLICATIONS

Extended European Search Report dated Nov. 11, 2016 for Application No. 16176471.7.

Primary Examiner — Gregory Blankenship
(74) Attorney, Agent, or Firm — Moser Taboada

(57) ABSTRACT

A fixing structure includes: a first member having a locked portion; a second member which is formed of a material having lower stiffness than that of the first member and includes a locking claw to be locked onto the locked portion; and a reinforcing member which is configured to limit bending of the locking claw.

11 Claims, 6 Drawing Sheets

(56) References Cited

U.S. PATENT DOCUMENTS

| | | | |
|---|---|---|---|
| 2013/0075172 A1* | 3/2013 | Hori | B60K 11/085 |
| | | | 180/68.1 |
| 2014/0216834 A1* | 8/2014 | Elliott | B60K 11/085 |
| | | | 180/68.1 |
| 2014/0291056 A1* | 10/2014 | Takanaga | B60K 11/085 |
| | | | 180/274 |
| 2015/0210235 A1* | 7/2015 | Maji | B60R 19/52 |
| | | | 296/193.1 |
| 2016/0193977 A1* | 7/2016 | Calleja | B60R 19/12 |
| | | | 293/115 |
| 2017/0001514 A1* | 1/2017 | Watari | B60R 19/52 |
| 2017/0008474 A1* | 1/2017 | Wey | B60R 19/52 |
| 2017/0144533 A1* | 5/2017 | Gilotte | B60K 11/085 |

FOREIGN PATENT DOCUMENTS

| | | |
|---|---|---|
| JP | 2009108887 A | 5/2009 |
| JP | 2012247037 A | 12/2012 |
| JP | 2013086720 A | 5/2013 |
| JP | 2013199178 A | 10/2013 |
| WO | WO-2015008571 A1 | 1/2015 |

* cited by examiner

FIXING STRUCTURE AND GRILLE SHUTTER UNIT

CROSS-REFERENCE TO RELATED APPLICATIONS

Priority is claimed on Japanese Patent Application No. 2015-130647, filed on Jun. 30, 2015, the content of which is incorporated herein by reference.

BACKGROUND

Field of the Invention

The present invention relates to a fixing structure and a grille shutter unit.

Description of the Related Art

For example, as described in Japanese Unexamined Patent Application, First Publication No. 2009-108887, a fixing structure in which members are positioned and fixed to each other by a locking claw has been widely provided in vehicles. For example, Japanese Unexamined Patent Application, First Publication No. 2009-108887 discloses a fixing structure in which a bumper and a fog lamp cover are fixed to each other by a locking claw. In addition, a grille shutter described in Japanese Unexamined Patent Application, First Publication No. 2013-199178 is also fixed to an air guide, which is fixed to a vehicle body, by a locking claw, thereby forming a fixing structure. For example, the air guide which guides air inflow and a frame which supports flaps are fixed to the grille shutter by the locking claw. In a case where the members are attached to each other, the locking claw is bent by abutting against the opponent member until a locking position where the opponent member locks is reached, and when the locking position is reached, the locking claw recovers its original shape and is locked onto the opponent member.

In the fixing structure described above, there may be cases where one member is joined to another member which is made of a different material, and one of the members therefore has a higher stiffness than the other. For example, in a case where the frame of the grille shutter has higher stiffness than that of the air guide and the locking claw is formed in the air guide, when the air guide is attached to the frame of the grille shutter, the locking claw has lower stiffness than that of the opponent member and is likely to be significantly bent. Therefore, depending on the force applied by an operator during the attaching operation, there may be cases where problems such as breaking of the locking claw occur, resulting in poor workability. In addition, even after the locking claw is attached to the locked member, the locking claw is likely to be deformed. Therefore, the members are slightly displaced by vibration of a vehicle, which results in rattling, noise, and the like. Therefore, in the related art, the members are fixed to each other by not only the locking claw but also by an auxiliary screw or the like.

The present invention has been made taking the above-described problems into consideration, and an object thereof is to prevent breaking of a locking claw during attachment of the locking claw in a fixing structure in which members are fixed to each other by the locking claw, and to enable the members to be firmly fixed to each other without using an additional screw.

The present invention employs the following configurations as means for solving the problems.

SUMMARY

According to a first aspect of the present invention, a fixing structure includes: a first member having a locked portion; a second member which is formed of a material having lower stiffness than that of the first member, the second member including a locking claw to be locked onto the locked portion; and a reinforcing member which is configured to limit bending of the locking claw.

The locking claw may include a flexible plate portion of which a root is connected to a base portion of the second member, and a protruding portion which protrudes from a surface of an end portion of the flexible plate portion and abuts against the locked portion, and the reinforcing member may include at least one rib which is fixed to the flexible plate portion and may have an elongated shape formed along a direction from the root of the flexible plate portion toward a tip end.

The rib may be formed on the surface of the flexible plate portion on which the protruding portion is provided.

The reinforcing member may include a plurality of the ribs, and a region between adjacent ribs among the plurality of the ribs may be a region where the locked portion is disposed.

The locking claw may include a stepped portion constituted by the protruding portion and the flexible plate portion.

According to a second aspect of the present invention, a grille shutter unit may include: the fixing structure according to the aspect, which includes a frame which supports flaps and is the first member, and an air guide which is fixed to the frame and is the second member.

According to the aspects of the present invention, the second member includes the locking claw having lower stiffness than that of the first member provided with the locked portion, and the second member is provided with the reinforcing member which limits bending of the locking claw. When the second member is attached to the first member, the locking claw provided in the second member can be prevented by the reinforcing member from being significantly bent by abutting against the first member. In addition, problems such as breaking of the locking claw during an operation of attaching the locking claw can be prevented. Furthermore, even after the locking claw is attached, deformation of the locking claw can be limited by the reinforcing member and thus the occurrence of rattling and noise due to vibration of the vehicle or the like can be prevented. Therefore, there is no need to fasten the first member to the second member with an auxiliary screw or the like. As described above, according to the aspects of the present invention, in the fixing structure in which the members are fixed to each other by the locking claw, breaking of the locking claw during attachment of the locking claw can be prevented, and the members can be firmly fixed to each other without using an additional screw.

DETAILED DESCRIPTION

Hereinafter, a fixing structure according to an embodiment of the present invention will be described with reference to the drawings. In the embodiment, a unit constituted by a grille shutter and an air guide is called a grille shutter unit, and an example in which the fixing structure according to the embodiment is applied to the grille shutter unit will be described. In the accompanying drawings, the scale of each member is appropriately changed in order to allow the member to have a recognizable size.

Figure 1:
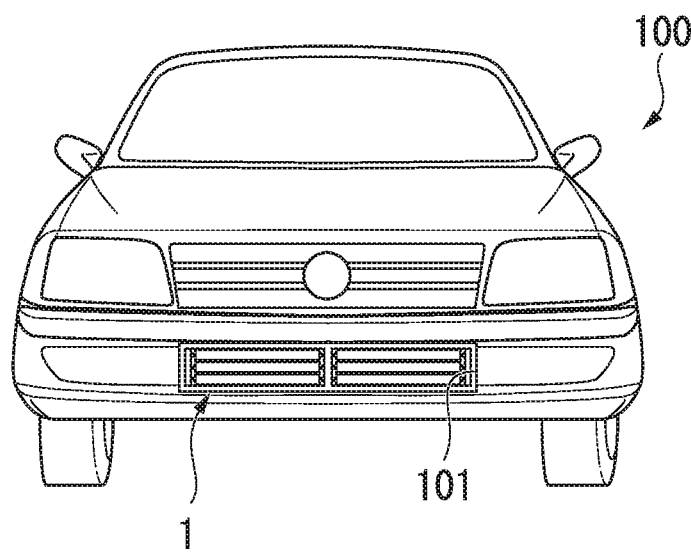
FIG. 1 is a front view of a vehicle in which a grille shutter unit according to an embodiment of the present invention is installed.

FIG. 1 is a front view of a vehicle in which a grille shutter unit 1 according to the embodiment is installed. As shown in FIG. 1, a bumper opening 101 is provided in the front surface of a vehicle 100 to bring external air into an engine compartment. The grille shutter unit 1 according to the embodiment is provided on the inside of the bumper opening 101.

Figure 2:
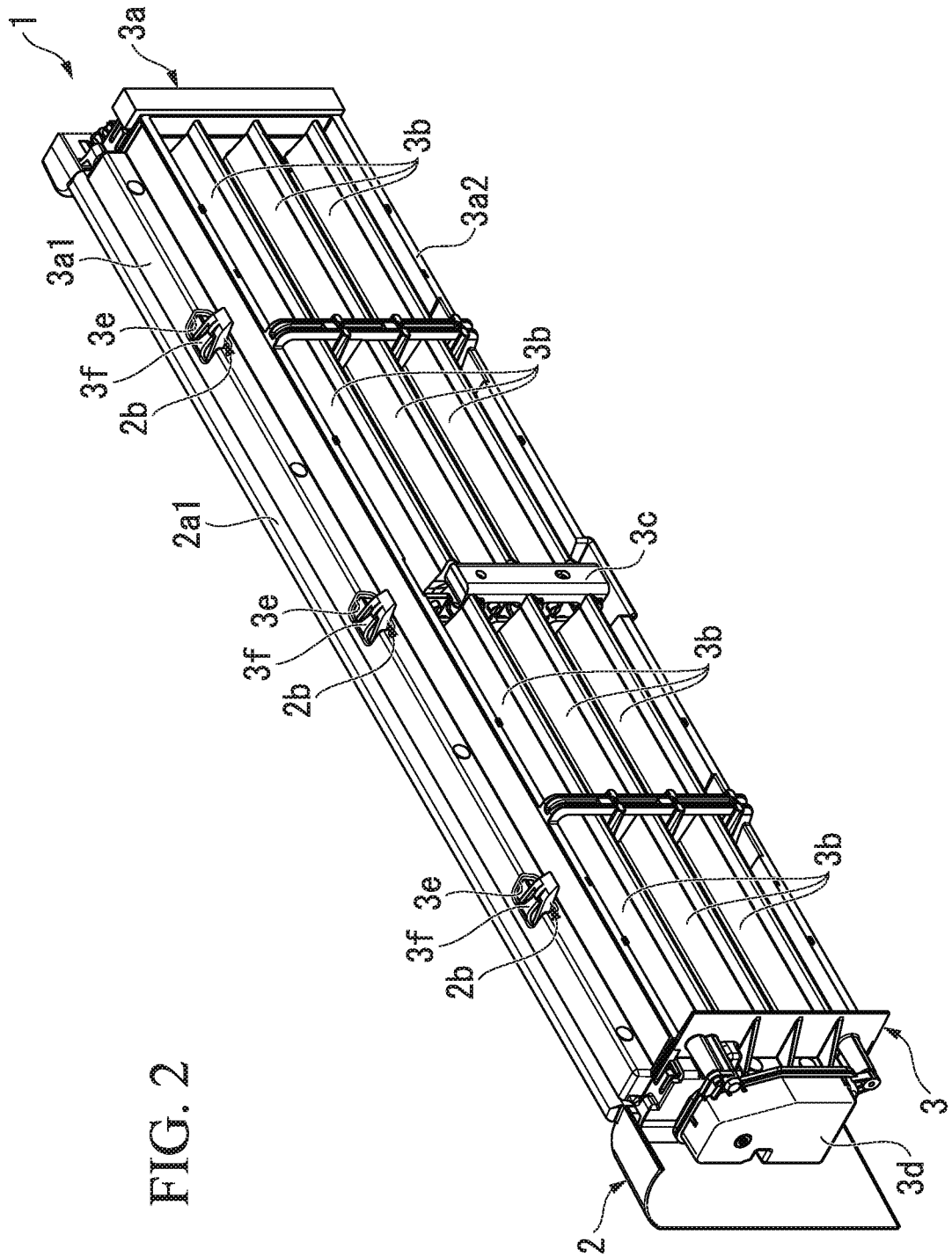
FIG. 2 is a perspective view showing a schematic configuration of the grille shutter unit according to the embodiment of the present invention.
Figure 3:
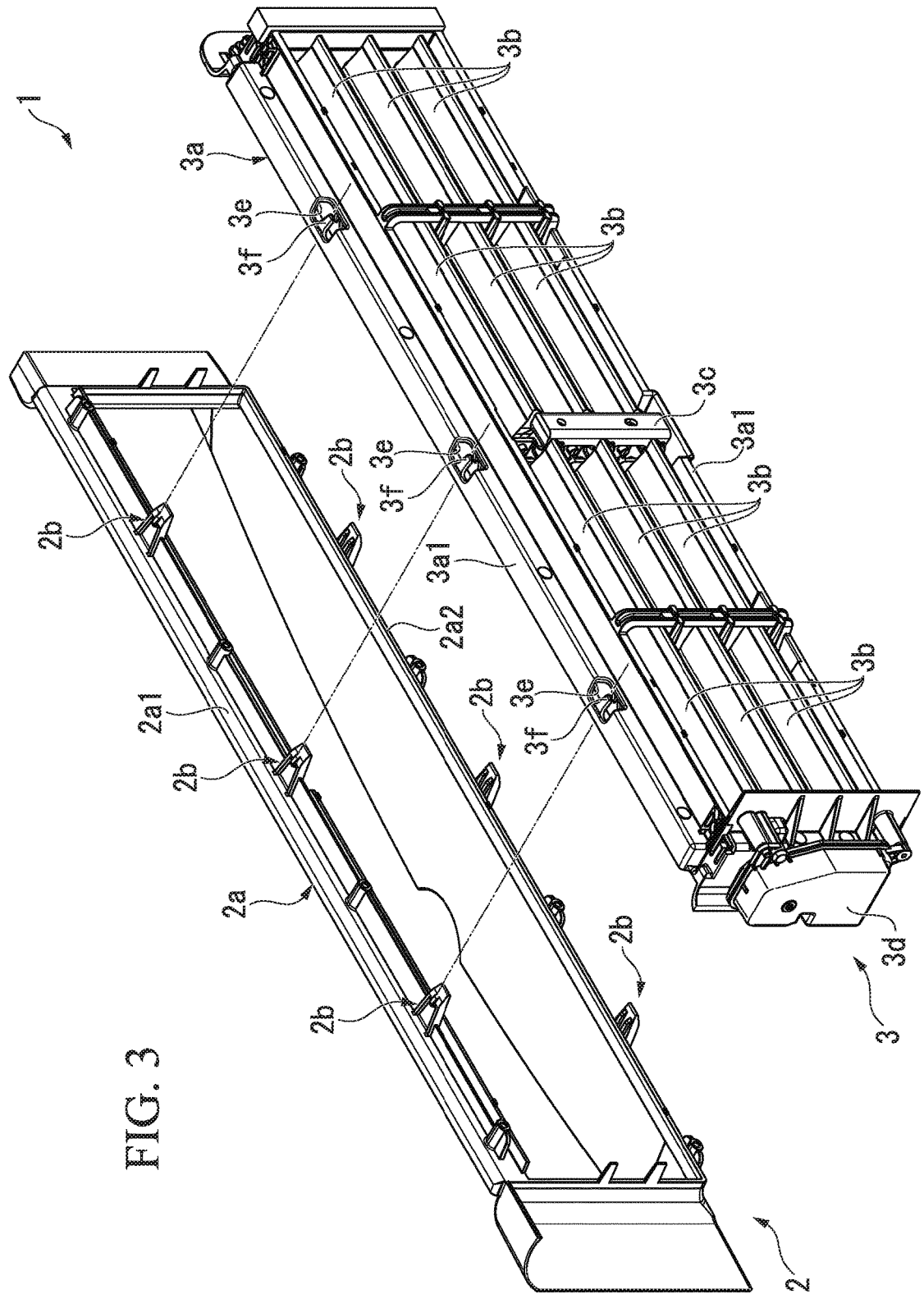
FIG. 3 is an exploded perspective view showing the schematic configuration of the grille shutter unit according to the embodiment of the present invention.

FIG. 2 is a perspective view showing a schematic configuration of the grille shutter unit 1 according to the embodiment. FIG. 3 is an exploded perspective view showing the schematic configuration of the grille shutter unit 1 according to the embodiment.

As shown in FIGS. 2 and 3, the grille shutter unit 1 according to the embodiment includes an air guide (second member) 2 and a grille shutter 3.

The air guide 2 is a frame member having an opening formed at the center, and is fixed to a vehicle body by a fixing member (not shown). The air guide 2 is disposed in the vehicle body so as to fill a gap between the grille shutter 3 and the vehicle body and guides air that flows through the bumper opening 101 to the grille shutter 3. The air guide 2 is formed of a material having lower stiffness (that is, having a low Young's modulus) than that of a frame (first member) 3a of the grille shutter 3, which will be described later, and for example, is formed of an olefinic elastomer. As shown in FIG. 3, the air guide 2 includes a base frame 2a (base portion), and locking claws 2b which protrude toward the rear side of the vehicle from the base frame 2a.

The base frame 2a is a frame body having a larger rectangular shape than that of the grille shutter 3 and is disposed to surround a region in which flaps 3b of the grille shutter 3, which will be described later, are disposed. The locking claws 2b are arranged in a horizontal direction with respect to an upper side portion 2a1 and a lower side portion 2a2 of the base frame 2a, and a plurality of locking claws 2b (three locking claws 2b for each of the upper side portion 2a1 and the lower side portion 2a2 in the embodiment) are formed.

Figure 4A:
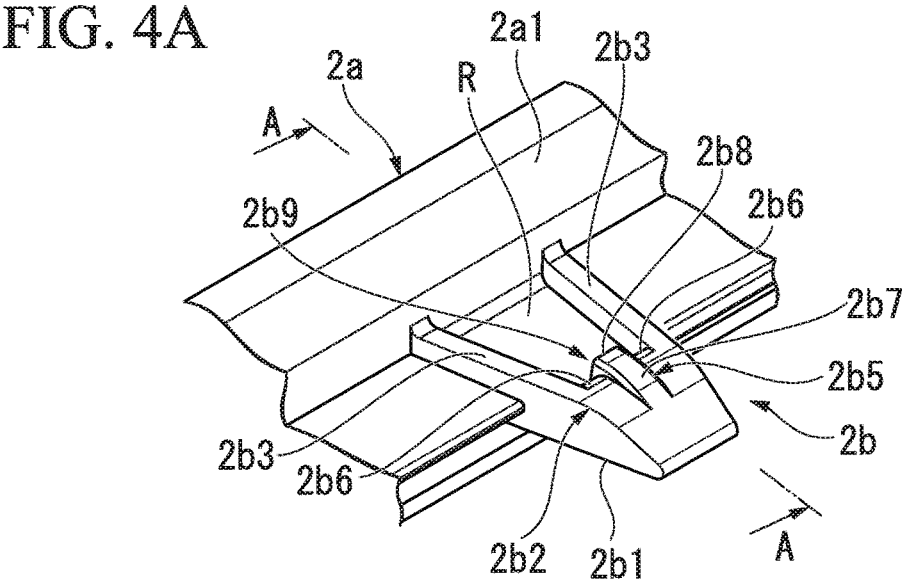
FIG. 4A is an enlarged perspective view of a locking claw provided in the grille shutter unit according to the embodiment of the present invention, when viewed from above.
Figure 4B:
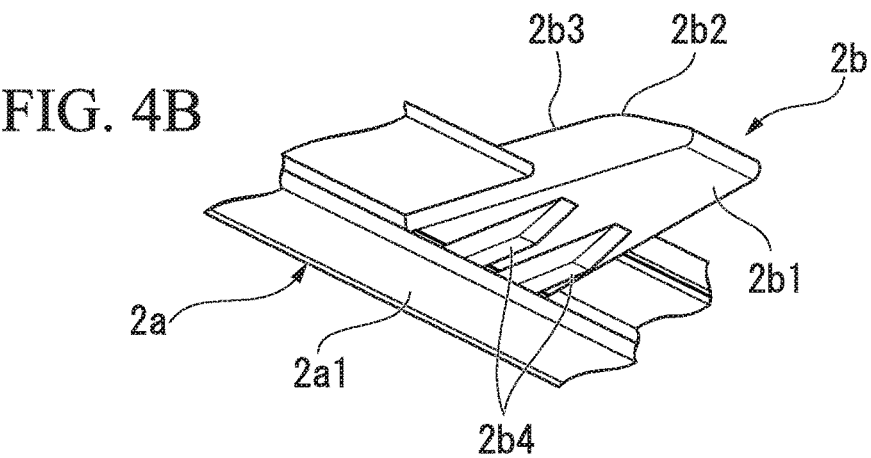
FIG. 4B is an enlarged perspective view of the locking claw provided in the grille shutter unit according to the embodiment of the present invention, when viewed from below.
Figure 4C:
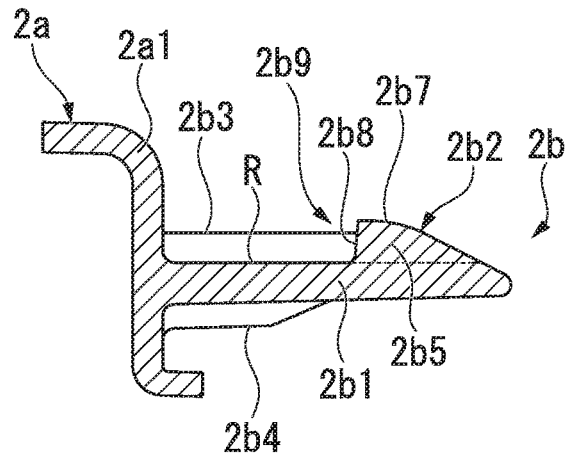
FIG. 4C is a sectional view of the locking claw shown in FIG. 4A, which is taken along line A-A.

FIGS. 4A to 4C are enlarged views of a single locking claw 2b formed in the upper side portion 2a1 of the base frame 2a.

FIG. 4A is an enlarged perspective view of the locking claw 2b viewed from above.

FIG. 4B is an enlarged perspective view of the locking claw 2b viewed from below.

FIG. 4C is a sectional view of the locking claw shown in FIG. 4A, which is taken along line A-A.

As shown in FIGS. 4A to 4C, the locking claw 2b includes a base plate 2b1 (flexible plate portion), a protruding portion 2b2, curvature prevention ribs 2b3 (reinforcing members), and lower surface ribs 2b4. In addition, in the description of the locking claw 2b, a direction perpendicular to the surface of the base frame 2a (rightward and leftward directions in FIG. 4C) is referred to as a longitudinal direction, and a horizontal direction orthogonal to the longitudinal direction (a direction perpendicular to FIG. 4C) is referred to as a width direction.

The base plate 2b1 of the locking claw 2b is a flexible plate-shaped portion which is horizontally disposed so that the root thereof is connected to the upper side portion 2a1 of the base frame 2a and the tip end thereof is directed toward the rear side of the vehicle. The shape of the base plate 2b1 when viewed from above is formed in a trapezoidal shape in which the horizontal width of the root connected to the base frame 2a is greater than the horizontal width of the tip end. Since the base plate 2b1 is formed in a trapezoidal shape, the joint area of the base plate 2b1 and the base frame 2a can be increased, and the posture of the locking claw 2b can be stabilized more.

In a case where the protruding portion 2b2 is pressed downward, the base plate 2b1 is curved to cause the tip end to be moved downward. In a case where no pressing force is exerted on the protruding portion 2b2, the base plate 2b1 recovers its original shape. A center region on the upper surface of the base plate 2b1 (a region surrounded by the two curvature prevention ribs 2b3 and the protruding portion 2b2) is a flat surface region R exposed to the upper side.

The protruding portion 2b2 is a portion formed at the surface of a longitudinal end portion (tip end portion) of the base plate 2b1 and protrudes upward from the base plate 2b1. The protruding portion 2b2 includes a center protrusion 2b5 disposed at the center in the width direction, and bottom wall portions 2b6 which are disposed on both sides with the center protrusion 2b5 interposed therebetween.

In the embodiment, when the grille shutter unit 1 is installed in the vehicle, the protruding portion 2b2 protrudes from the base plate 2b1 in a direction perpendicular to the forward and rearward directions of the vehicle. Here, the term "perpendicular" may not be strictly 90 degrees.

The center protrusion 2b5 is a portion formed higher than the bottom wall portions 2b6 (that is, with a higher protruding amount from the base plate 2b1). The center protrusion 2b5 includes a curved surface 2b7 which faces the tip end side (the right side in FIG. 4C) of the locking claw 2b and an upright surface 2b8 faces the root side (the left side in FIG. 4C) of the locking claw 2b. The curved surface 2b7 is curved such that the longitudinal center portion of the locking claw 2b is swollen and is disposed at a position higher than the upper surface of the bottom wall portion 2b6. The curved surface 2b7 slides with respect to a locking plate 3f when the locking claw 2b is locked onto the locking plate 3f provided in the frame 3a of the grille shutter 3.

The upright surface 2b8 is a surface that faces the front side of the vehicle (the left side in FIG. 4C), and the upper end is bent and connected to the curved surface 2b7 while the lower end is bent and connected to the flat surface region R of the base plate 2b1. The upright surface 2b8 acts as a receiving surface of the locking plate 3f (locked portion). In addition, as shown in FIG. 4C, in the embodiment, a stepped portion 2b9 is formed by the flat surface region R of the base plate 2b1, the upright surface 2b8 which stands substantially upright on the flat surface region R, and the curved surface 2b7 which is connected to the upright surface 2b8 above the flat surface region R.

The bottom wall portions 2b6 are disposed on both sides of the center protrusion 2b5 in the width direction and are connected to the curvature prevention ribs 2b3. The height of the bottom wall portions 2b6 is the same as that of the curvature prevention ribs 2b3. Since the height of the bottom wall portions 2b6 is the same as that of the curvature prevention ribs 2b3, the upper surfaces of the bottom wall portions 2b6 are connected to the upper surfaces of the curvature prevention ribs 2b3 on the same plane without a difference in height between the bottom wall portions 2b6 and the curvature prevention ribs 2b3 in the height direction.

The curvature prevention ribs 2b3 are formed at the edge portions of the base plate 2b1 in the width direction so as to be formed along the oblique sides of the base plate 2b1 formed in a trapezoidal shape, and two curvature prevention ribs 2b3 are disposed with the flat surface region R of the base plate 2b1 interposed therebetween in the width direction. That is, the curvature prevention ribs 2b3 are formed on a surface (top surface) on which the protruding portion 2b2 is formed in the base plate 2b1 (that is, the upper surface in the locking claw 2b shown in FIGS. 4A to 4C). In addition, each of the curvature prevention ribs 2b3 is formed in an elongated shape that extends in the longitudinal direction such that the size (length) in the width direction is smaller than the size (length) in the longitudinal direction. In addition, the root of each of the curvature prevention ribs 2b3 is connected to the base frame 2a, and the tip ends of the curvature prevention ribs 2b3 are respectively connected to the bottom wall portions 2b6. The two curvature prevention ribs 2b3 which are adjacent to each other are disposed to be inclined with respect to the normal line of the base frame 2a so that the curvature prevention ribs 2b3 become closer to each other in a direction from the roots toward the tip ends.

In addition, in the embodiment, the curvature prevention ribs 2b3 protrude from the base plate 2b1 in a direction perpendicular to the forward and rearward directions of the vehicle when the grille shutter unit 1 is installed in the vehicle. Here, the term "perpendicular" may not be strictly 90 degrees.

In a case where the protruding portion 2b2 is pressed downward and the base plate 2b1 is curved, the curvature prevention ribs 2b3 are curved along with the base plate 2b1. Therefore, the resistance of the locking claw 2b during curvature is increased due to the curvature prevention ribs 2b3, and thus the stiffness of the locking claw 2b increases compared to a case where the curvature prevention ribs 2b3 are not formed. That is, in the embodiment, the stiffness of the locking claw 2b of the air guide 2 formed of a material having low stiffness is increased due to the curvature prevention ribs 2b3.

As shown in FIG. 4B, two lower surface ribs 2b4 are formed at the root portions of the lower surface of the base plate 2b1. Each of the lower surface ribs 2b4 are formed to extend in the longitudinal direction. The lower surface ribs 2b4 reinforce the bonding of the locking claw 2b to the base frame 2a and prevent the locking claw 2b from being broken from the root.

In addition, in the embodiment, when the grille shutter unit 1 is installed in the vehicle, the lower surface ribs 2b4 protrude from the base plate 2b1 in a direction perpendicular to the forward and rearward directions of the vehicle. Here, the term "perpendicular" may not be strictly 90 degrees.

In addition, as described above, in the base frame 2a, the locking claws 2b are formed not only in the upper side portion 2a1 but also in the lower side portion 2a2. The locking claw 2b formed in the lower side portion 2a2 has a vertically inverted shape of the locking claw 2b formed in the upper side portion 2a1 described with reference to FIGS. 4A to 4C, and a detailed description thereof will be omitted here.

As shown in FIG. 3, the grille shutter 3 includes the frame 3a, the flaps 3b, a link member 3c, and an actuator 3d. The frame 3a is a frame-like member which rotatably supports the flaps 3b and is formed of a material having higher stiffness than that of the air guide 2. The frame 3a is formed of, for example, polypropylene. An upper side portion 3a1 of the frame 3a is provided with openings 3e corresponding to the locking claws 2b formed in the upper side portion 2a1 of the air guide 2. In addition, the edge portion of the upper side of each of the openings 3e is provided with the locking plate 3f (locked portion) which is inclined such that the tip end is lower than the root in height. The locking plate 3f is disposed to form a gap from the edge portion of the lower side of the opening 3e and is locked onto the locking claw 2b of the air guide 2 inserted into the gap. Although not shown in FIG. 3, a lower side portion 3a2 of the frame 3a is also provided with the openings 3e and the locking plates 3f formed to have vertically inverted shapes of the openings 3e and the locking plates 3f formed in the upper side portion 3a1.

Figure 5A:
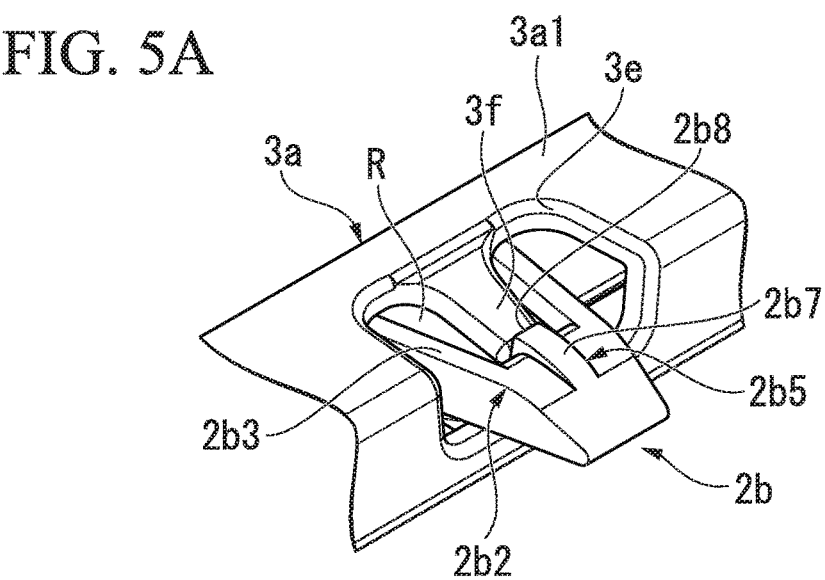
FIG. 5A is an enlarged perspective view including the locking claw and a locking plate provided in the grille shutter unit according to the embodiment of the present invention.
Figure 5B:
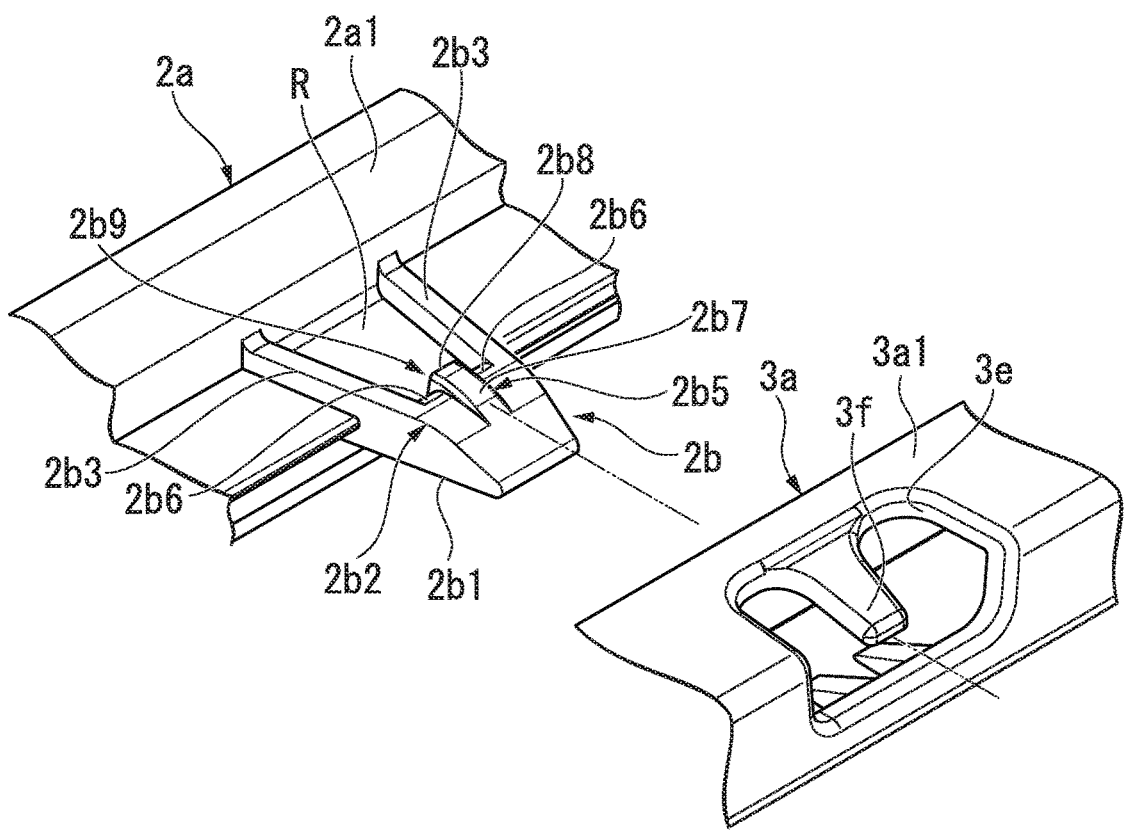
FIG. 5B is an exploded perspective view of the locking claw and the locking plate provided in the grille shutter unit according to the embodiment of the present invention.

FIG. 5A is an enlarged perspective view including the locking claw 2b of the air guide 2 and the locking plate 3f. FIG. 5B is an exploded perspective view of FIG. 5A. As shown in FIGS. 5A and 5B, the locking claw 2b is inserted into the opening 3e and the upright surface 2b8 of the center protrusion 2b5 abuts against the tip end of the locking plate 3f such that the locking claw 2b is locked onto the locking plate 3f. As the locking claw 2b is locked onto the locking plate 3f, the air guide 2 and the grille shutter 3 are fixed to each other.

In FIG. 3, the flaps 3b are pivotally supported in the frame 3a and are rotated about their shafts in the frame 3a such that the opening ratio of the frame 3a is adjusted. The flaps 3b are arranged in three rows in the vertical direction and in four rows in the vehicle width direction such that a total of 12 flaps are installed in this embodiment. However, the number of flaps 3b may be changed. The link member 3c is connected to all the flaps 3b, and in synchronization with the rotation of a single flap 3b (driving flap), rotates the other flaps 3b. The actuator 3d is directly connected to the single flap 3b to rotate the flap 3b as the driving flap.

In the grille shutter unit 1 according to the embodiment in the above-described configuration, the opening ratio of the grille shutter 3 is adjusted by the rotational angles of the flaps 3b such that external air received by the air guide 2 side is brought into the engine compartment at a flow rate corresponding to the opening ratio of the grille shutter 3.

In a case where the grille shutter unit 1 of the embodiment is assembled, that is, in a case where the air guide 2 is attached to the grille shutter 3, the air guide 2 is fixed to the grille shutter 3 by locking the locking claw 2b of the air guide 2 to the locking plate 3f of the grille shutter 3.

Figure 6A:
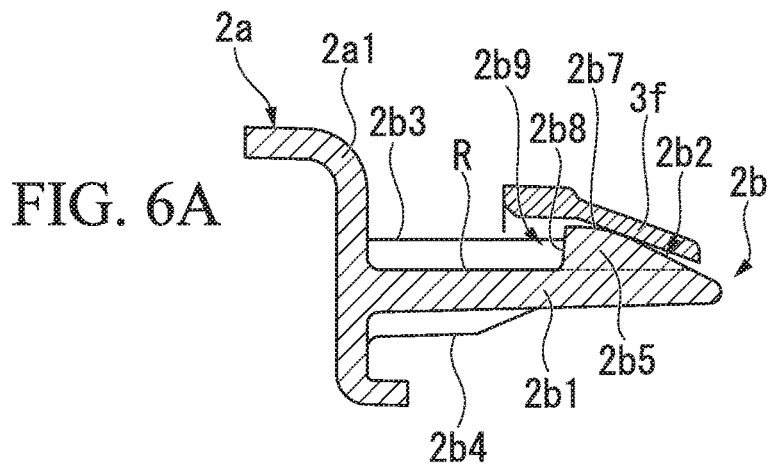
FIG. 6A is a schematic sectional view showing an operation of locking the locking claw provided in the grille shutter unit according to the embodiment of the present invention to the locking plate and a state before the locking claw is locked to the locking plate.
Figure 6B:
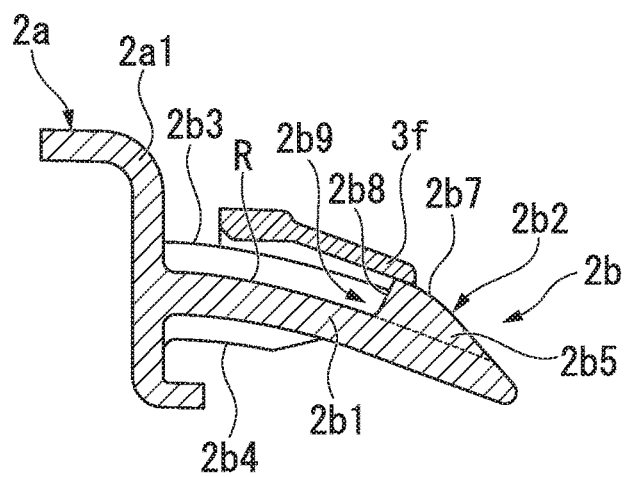
FIG. 6B is a schematic sectional view showing the operation of locking the locking claw provided in the grille shutter unit according to the embodiment of the present invention to the locking plate and a state during the operation of locking the locking claw to the locking plate.
Figure 6C:
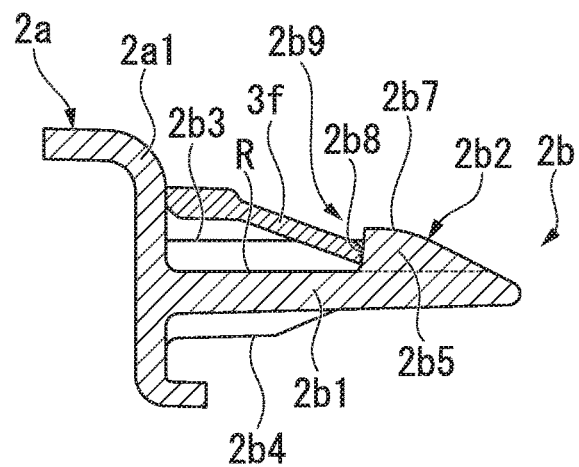
FIG. 6C is a schematic sectional view showing the operation of locking the locking claw provided in the grille shutter unit according to the embodiment of the present invention to the locking plate and a state after the locking claw is locked to the locking plate.

FIGS. 6A to 6C are schematic sectional views showing an operation of locking the locking claw 2b to the locking plate 3f. First, as shown in FIG. 6A, when the locking claw 2b is inserted into the lower side of the locking plate 3f, the curved surface 2b7 of the center protrusion 2b5 of the locking claw 2b abuts against the lower surface of the locking plate 3f.

Furthermore, as shown in FIG. 6B, when the locking claw 2b is moved forward, the locking claw 2b is guided by the locking plate 3f and the center protrusion 2b5 of the locking claw 2b is pushed into the lower side thereof. At this time, the tip end of the locking claw 2b is pushed into the lower side such that the base plate 2b1 is curved. Here, in the embodiment, the curvature prevention ribs 2b3 which limit bending of the locking claw 2b and improve the stiffness of the locking claw 2b are formed in the locking claw 2b. Therefore, the base plate 2b1 is not curved to a higher degree than necessary. For example, even when an operator forcibly pushes the air guide 2, curvature of the locking claw 2b is prevented by the curvature prevention rib 2b3, and a reaction force is transmitted to the operator. Therefore, the operator can perform the operation of attaching the locking claw 2b again before the locking claw 2b is damaged.

When the locking claw 2b is further moved forward and the center protrusion 2b5 of the locking claw 2b passes the position of the tip end of the locking plate 3f as shown in FIG. 6C, a pressing force is not exerted on the center protrusion 2b5 and the base plate 2b1 (that is, the locking claw 2b) recovers its original shape. Accordingly, the tip end of the locking plate 3f abuts against the upright surface 2b8 of the locking claw 2b and the locking claw 2b is locked onto the locking plate 3f. In addition, when the center protrusion 2b5 of the locking claw 2b passes the position of the tip end of the locking plate 3f, the locking claw 2b swiftly recovers its original shape by the stepped portion 2b9.

At this time, sound and vibration occur and thus the operator can recognize the locking of the locking claw 2b to the locking plate 3f.

In the grille shutter unit 1 according to the embodiment described above, the locking claw 2b which is formed of a material having lower stiffness than that of the frame 3a of the grille shutter 3 provided in the locking plate 3f is provided, and the curvature prevention ribs 2b3 are provided as the reinforcing members for limiting bending of the locking claw 2b. When the air guide 2 provided with the locking claws 2b is attached to the frame 3a of the grille shutter 3, the locking claw 2b can be prevented from being significantly bent while abutting against the frame 3a by the curvature prevention ribs 2b3, and problems such as breaking of the locking claw 2b during an operation of attaching the locking claw 2b can be prevented. Furthermore, even after the locking claw 2b is attached, deformation of the locking claw 2b can be limited by the curvature prevention ribs 2b3 and thus the occurrence of rattling and noise due to vibration of the vehicle or the like can be prevented. Therefore, there is no need to fasten the air guide 2 to the grille shutter 3 with an auxiliary screw or the like. Accordingly, it is possible to reduce the number of screws used to fasten the air guide 2 to the grille shutter 3 in the related art.

In addition, in the grille shutter unit 1 according to the embodiment, the locking claw 2b includes the base plate 2b1 of which the root is connected to the base frame 2a, and the protruding portion 2b2 (the center protrusion 2b5) which protrudes from the surface of the end portion of the base plate 2b1 and abuts against the locking plate 3f. In addition, the curvature prevention ribs 2b3 are fixed to the base plate 2b1 and are formed in an elongated shape along a direction from the root of the base plate 2b1 toward the tip end. Therefore, the reinforcing member according to the embodiment can be formed in a simple configuration, and the air guide 2 can be easily formed.

In addition, in the grille shutter unit 1 according to the embodiment, the curvature prevention ribs 2b3 are formed on the surface on which the protruding portion 2b2 is formed in the base plate 2b1. That is, the curvature prevention ribs 2b3 are formed on the same surface (top surface) as the surface on which the protruding portion 2b2 is formed among the surface and the rear surface of the base plate 2b1. Therefore, it is possible to install the curvature prevention ribs 2b3 without an increase in the height of the locking claw 2b.

Moreover, in the grille shutter unit 1 according to the embodiment, the two curvature prevention ribs 2b3 are formed, and the locking plate 3f is disposed between the two curvature prevention ribs 2b3. That is, the two curvature prevention ribs 2b3 which are adjacent to each other are formed so that the region therebetween becomes a region where the locking plate 3f is to be disposed. Therefore, after the air guide 2 is attached to the grille shutter 3, even in a case where the locking plate 3f tries to move in the vehicle width direction with respect to the locking claw 2b for some reason, the curvature prevention ribs 2b3 abut against the locking plate 3f and prevent the locking plate 3f (that is, the air guide 2) from moving with respect to the grille shutter 3.

Furthermore, in the grille shutter unit 1 according to the embodiment, the locking claw 2b includes the stepped portion 2b9 constituted by the center protrusion 2b5 of the protruding portion 2b2 and the base plate 2b1. Therefore, when the center protrusion 2b5 of the locking claw 2b passes the position of the tip end of the locking plate 3f, the locking claw 2b can rapidly and swiftly recover its original shape, which informs the operator that locking is completed.

While the preferred embodiment of the present invention has been described above with reference to the accompanying drawings, it is natural that the present invention is not limited to the embodiment. The shapes, combinations, and the like of the constituent members described in the above embodiment are only examples, and various changes based on design requirements and the like can be made without departing from the present invention.

For example, in the embodiment, an example in which the fixing structure of the present invention is applied to the grille shutter unit 1 provided with the air guide 2 and the grille shutter 3 is described. However, the present invention is not limited thereto, and may be applied to a fixing structure in which two members formed of materials having different stiffnesses are fixed to each other. For example, the present invention may also be applied to a fixing structure in which a bumper and a fog lamp cover are fixed to each other.

In addition, in the embodiment, the configuration in which the curvature prevention ribs 2b3 are portions of the locking claw 2b and are formed of the same material as that of the other elements of the locking claw 2b is described. However, the present invention is not limited thereto, and the curvature prevention ribs 2b3 may be separate members from the locking claw 2b. Furthermore, the material of the curvature prevention ribs 2b3 may be different from the material of the locking claw 2b.

Furthermore, in the embodiment, although an example in which two curvature prevention ribs 2b3 are formed on the base plate 2b1 is shown, two or more curvature prevention ribs 2b3 as a reinforcing member may be provided on the base plate 2b1.

While preferred embodiments of the invention have been described and shown above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

The invention claimed is:

1. A grille shutter unit comprising:
a frame having a locked portion;
an air guide which is formed of a material having lower stiffness than that of the frame, the air guide comprising a locking claw locked onto the locked portion; and
a reinforcing member which is configured to limit bending of the locking claw,
wherein the reinforcing member comprises a plurality of ribs, and
a region between adjacent ribs among the plurality of the ribs is a region where the locked portion is disposed.

2. The grille shutter unit according to claim 1,
wherein the locking claw comprises a flexible plate portion of which a root is connected to a base portion of the air guide, and a protruding portion which protrudes from a surface of an end portion of the flexible plate portion and abuts against the locked portion,
the plurality of the ribs is fixed to the flexible plate portion, and
the plurality of the ribs has an elongated shape formed along a direction from the root of the flexible plate portion toward a tip end.

3. The grille shutter unit according to claim 2,
wherein the plurality of the rib is formed on the surface of the flexible plate portion on which the protruding portion is provided.

4. The grille shutter unit according to claim 2,
wherein the locking claw comprises a stepped portion constituted by the protruding portion and the flexible plate portion.

5. The grille shutter unit according to claim 3,
wherein the locking claw comprises a stepped portion constituted by the protruding portion and the flexible plate portion.

6. The grille shutter unit according to claim 1,
wherein the frame supports flaps, and the air guide is fixed to the frame.

7. The grille shutter unit according to claim 2,
wherein the frame supports flaps, and the air guide is fixed to the frame.

8. The grille shutter unit according to claim 3,
wherein the frame supports flaps, and the air guide is fixed to the frame.

9. The grille shutter unit according to claim 4,
wherein the frame supports flaps, and the air guide is fixed to the frame.

10. The grille shutter unit according to claim 5,
wherein the frame supports flaps, and the air guide is fixed to the frame.

11. The grille shutter unit according to claim 2,
wherein the protruding portion has an upright surface,
the locked portion contacts with the upright surface, and
the locked portion is disposed so as to be accommodated in the region between the adjacent ribs.

* * * * *